UNITED STATES PATENT OFFICE.

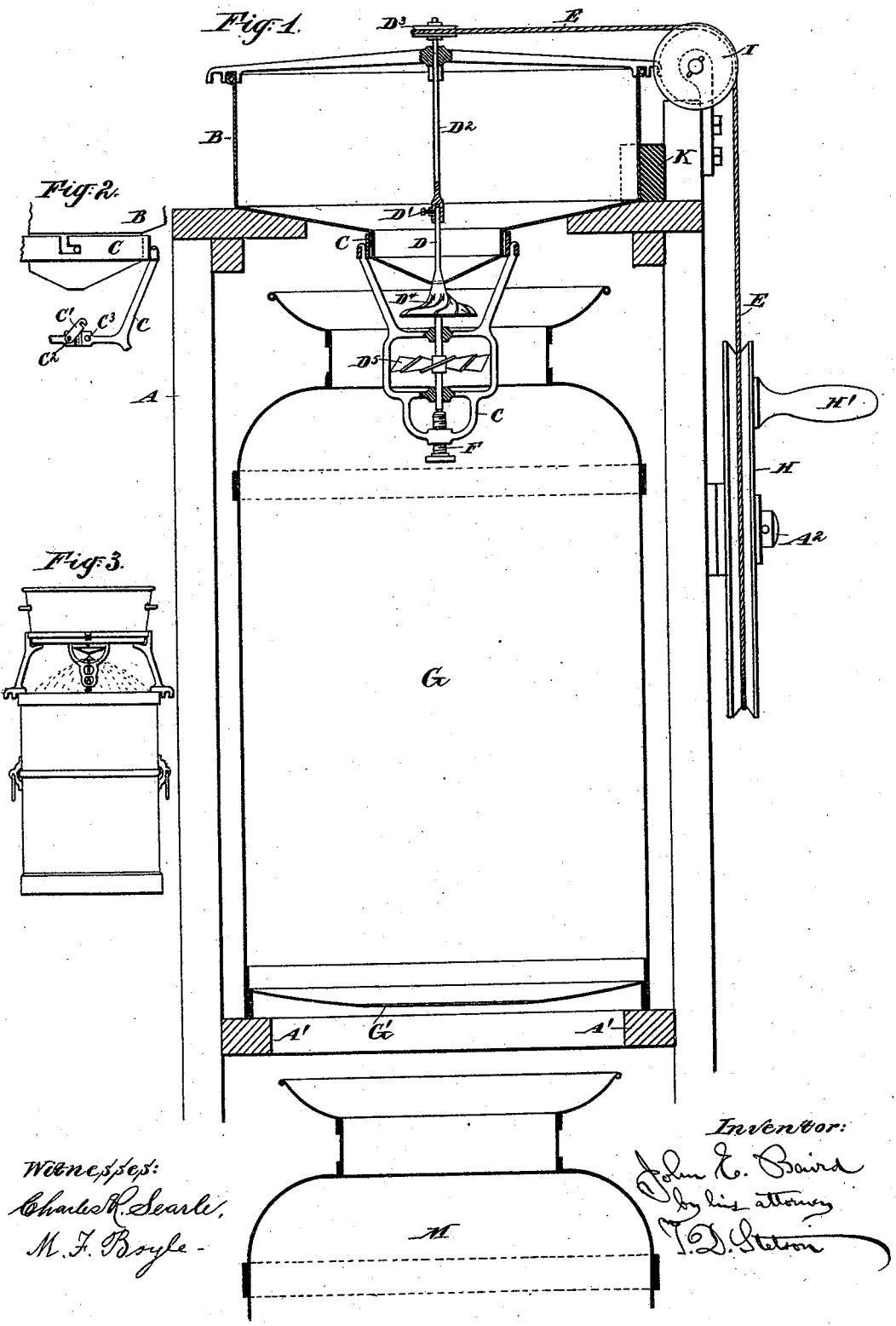

JOHN EDWIN BAIRD, OF LEONARDSVILLE, NEW YORK.

MILK COOLER AND AERATOR.

SPECIFICATION forming part of Letters Patent No. 496,377, dated April 25, 1893.

Application filed November 22, 1892. Serial No. 452,841. (No model.)

*To all whom it may concern:*

Be it known that I, JOHN EDWIN BAIRD, a citizen of the United States, residing at Leonardsville, in the county of Madison, in the State of New York, have invented a certain new and useful Improvement in Milk Coolers and Aerators, of which the following is a specification.

My invention can be used with the aid of cold water or ice where such are available, but it is adapted to serve without such aid, or to reduce the necessity for any large quantities of such water or ice, by the cooling effect of radiation due to extended surfaces, and of convection due to an active circulation of air. I provide for distributing the milk in spray or small drops, moving separately through the cold air, and gathered in a thin layer descending on the interior of a hollow casing or cooling vessel, which may be similar in general form and size to an ordinary milk-can having an aperture in the bottom for the discharge of the milk after it has been cooled by flowing over the extended surfaces of the interior. I provide for promoting a rapid exchange of the air in the cooling vessel, and the milk may be discharged from its bottom directly into the cans in which it is to be taken to market. The latter cans, after having been filled with milk greatly reduced in temperature by the action of my cooler, may be immersed in a small quantity of well-water, spring-water or ice-water, and the contents further cooled.

The accompanying drawings form a part of this specification and represent what I consider the best means of carrying out the invention.

Figure 1 is a central vertical section. Fig. 2 is a side elevation of a portion; and Fig. 3 is a side elevation on a smaller scale showing a modification.

Similar letters of reference indicate corresponding parts in all the figures where they appear.

A is a framing of wood, or other suitable material, certain portions being designated, when necessary, by super-numerals, as A'. It is adapted to support the several parts and allow their easy removal for cleansing and scalding.

B is a pan of tinned sheet iron, or other suitable material, into which the milk is poured, and through an aperture in the conical bottom of which it is allowed to escape in a small stream.

C is a detachable framing of enameled cast iron, or other suitable material, connected by a bayonet joint to the bottom of the pan B, and supporting an upright shaft D coupled by aid of a pinching-screw D' with an extension shaft $D^2$, on which is fixed a pulley $D^3$ receiving a round belt E, operated by any convenient means. A distributing wheel $D^4$, fixed on the shaft D, receives the milk and throws it tangentially off in drops. A fan-wheel $D^5$ on the same shaft promotes the circulation of air. The upper portion of the hub of the distributing wheel $D^4$ is conical, and capable by raising and lowering the shaft D and its connections of matching with varying degrees of tightness in the circular orifice in the bottom of the pan B.

F is a screw inserted from below through the bottom of the framing C, by means of which the shaft D is supported with little friction, and may also be easily adjusted in height to produce the best effect.

When only one or two persons are milking and the pails of milk are poured at long intervals into the pan B, the shaft D may be raised by turning the screw F in the proper direction and the milk allowed to flow out and be distributed from the wheel $D^4$ in a very fine stratum and in widely scattered drops. Under such conditions it becomes more thoroughly cooled than when, as it will be frequently the case, there are more hands engaged in the milking, and the pails of milk are emptied at shorter intervals into the pan B so as to require the screw F, and consequently the shaft D and its attachments, to be adjusted lower and the milk to be passed down correspondingly faster.

G is a cooling vessel or case of tinned sheet iron, or other suitable material. It may be similar in general form and size to one of the cans in which the milk is carried to market. It is conveniently supported on a shelf A' in the framing A, and remains in position during the whole period of cooling the milk, catching the milk sprayed from the wheel $D^4$, and allowing it to descend in a thin sheet extended over its whole inner surface, gathering in the bottom and trickling down through the liberal aperture G' into an ordinary can M, in which latter the milk is to be held, and either with or without further cooling carried to market.

The cooling case or vessel G, like all the other parts, can be easily removed for thorough cleaning, scalding and exposure to sunshine after each operation.

The fan-wheel $D^5$ carries screw-blades which force the air downward with a whirling motion. The air thus received circulates actively through the entire interior of the case G, gradually losing its whirling motion, and arriving at the bottom of the case it escapes freely through the aperture G' and out over the mouth of the can M below.

As the means for driving the shaft D and its attachments, I have shown a wheel H turning on a stud $A^2$ set in the outer face of one of the uprights of the framing A, and operated by a crank H', the belt running over guide-pulleys I supported on the same framing.

With the ordinary temperature of the night air, my apparatus will lower the temperature of the milk efficiently and rapidly. If spring or well-water is available, the cans may afterward be lowered into such water, and the temperature of the milk further reduced without requiring much water. If ice is available, it may be used to reduce the temperature of such cooling water, or applied in any other convenient way to the exterior of the cans M.

K is a wedge of wood or other suitable material which braces the pan B against displacement by the tension of the belt E. Its wedge form allows it to be easily adjusted to maintain the proper tension on the belt. The latter may have hooks, as is common in round belts of sewing-machines, to enable it to be easily united and separated. After the close of each operation, the belt is detached and laid aside, and the extension shaft $D^2$ with its pulley $D^3$ disconnected; then the pan B and its attachments may be lifted out, the framing C separated by its bayonet joint from the pan, and, if desired, the shaft D with its attachments may be removed from the framing. To facilitate this, the upper bearing of the shaft is made to be easily opened by the aid of a movable piece C' turning on a pivot $C^2$, and having a hook which when it is in position engages it with a stud $C^3$ in the framing C. All the parts being thus separated, and the cooling vessel G being lifted out of the frame, all the parts may be thoroughly scalded and sunned, and the whole is rapidly and easily set in order for work again the next time it is required.

Modifications may be made in the details without departing from the principle or sacrificing the advantages of the invention. Instead of driving the air downward, the blades of the fan-wheel $D^5$ may be inclined in the opposite direction and the air induced to move upward instead of downward through the cooling vessel G. This latter will conform to the natural tendency of the air to rise in consequence of the warmth received from the milk, but the latter force is very slight. I prefer the arrangement shown for the reason among others that the air within the cooling vessel is subject to a rotary motion which increases its cooling effect.

The invention is adapted for treating milk which is to be taken to a creamery or cheese factory, where it is used with little delay, and the cooling need not be very effective. In such cases satisfactory results can always be obtained without the use of cold water or ice.

Parts of the invention can be used without the whole.

Fig. 3 shows a modification in which the pan corresponding to B is carried in a slight frame standing on the intermediate can corresponding to G, and the milk is scattered and cooled and aerated by a horizontal wheel corresponding to $D^4$, without any fan, and therefore turned easily and rapidly by any convenient means. It may be turned by the flow of the milk down from the pan above after the manner of a water-wheel. This wheel is adjusted up and down by a screw corresponding to F.

I claim as my invention—

1. In a milk cooler and aerator, a frame A to support the parts, a pan B, framing C and upright shaft D, and a wheel $D^4$ with the wheel H and connecting mechanism for giving it an active rotary motion for scattering the milk, in combination with each other and with the hollow casing G open at top and bottom to allow the milk to move down in a thin stratum in its interior and be received in a can M below, all arranged for joint operation substantially as herein specified.

2. In a milk cooler and aerator, a frame A to support the parts, a pan B, framing C and upright shaft D, with pulley $D^3$ for receiving motion, and a wheel $D^4$ for scattering the milk, in combination with each other and with the hollow casing G open at top and bottom to allow the milk to move down in a thin stratum in its interior and be received in a can M below, the fan-wheel $D^5$ adapted to induce an active movement of the air within the casing and provisions for readily separating the several parts for thorough cleaning, all substantially as herein specified.

3. In a milk-cooler and aerator, in combination with a suitable frame and pan, and inclosing case for allowing the milk to be cooled in a thin stratum, and with provisions for circulating air to absorb and convey away the heat thereof, the distributing wheel $D^4$, having a hub with a tapering upper surface fitting loosely in a circular orifice in the pan, and the adjusting screw F arranged to raise and lower the wheel whereby the wheel performs the two functions of not only scattering the milk to effect its cooling but also of regulating its flow, substantially as herein specified.

In testimony that I claim the invention above set forth I affix my signature in presence of two witnesses.

JOHN EDWIN BAIRD.

Witnesses:
MORELL COON,
EDGAR B. MASON.